(12) United States Patent
Grossinger et al.

(10) Patent No.: US 6,364,483 B1
(45) Date of Patent: Apr. 2, 2002

(54) SIMULTANEOUS MULTIFOCAL CONTACT LENS AND METHOD OF UTILIZING SAME FOR TREATING VISUAL DISORDERS

(75) Inventors: Israel Grossinger; Michael Golub, both of Rehovot (IL)

(73) Assignee: Holo OR Ltd., Rehovot (IL)

( * ) Notice: Subject to any disclaimer, the term of this patent is extended or adjusted under 35 U.S.C. 154(b) by 0 days.

(21) Appl. No.: 09/507,701

(22) Filed: Feb. 22, 2000

(51) Int. Cl.⁷ .................................................. G02C 7/04
(52) U.S. Cl. ........................................ 351/161; 351/177
(58) Field of Search ...................... 351/160 R, 160 H, 351/161, 162, 177

(56) References Cited

U.S. PATENT DOCUMENTS

| | | |
|---|---|---|
| 4,704,016 A | 11/1987 | de Carle |
| 4,890,913 A | 1/1990 | de Carle |
| 4,923,296 A | 5/1990 | Erickson |
| 5,225,858 A | 7/1993 | Portney |
| 5,436,678 A | 7/1995 | Carroll |
| 5,448,312 A | 9/1995 | Roffman et al. |
| 5,682,223 A | 10/1997 | Menezes et al. |
| 5,702,440 A | 12/1997 | Portney |
| 5,715,031 A | 2/1998 | Roffman et al. |
| 5,864,378 A | 1/1999 | Portney |
| 5,864,379 A | 1/1999 | Dunn |
| 5,877,839 A | 3/1999 | Portney |
| 5,919,229 A | 7/1999 | Portney |
| 5,929,969 A | 7/1999 | Roffman |
| 5,982,543 A | 11/1999 | Fiala |

*Primary Examiner*—Scott J. Sugarman
(74) *Attorney, Agent, or Firm*—Mark M. Friedman

(57) ABSTRACT

A simultaneous multifocal contact lens for correcting vision acuity of an individual is disclosed. The contact lens comprises a central region radially surrounded by at least one far vision focal region and at least one near vision focal region, wherein a near vision additional correction of the at least one near vision focal region is overcorrected by at least 10% with respect to the near vision additional correction prescribed for the

63 Claims, 4 Drawing Sheets

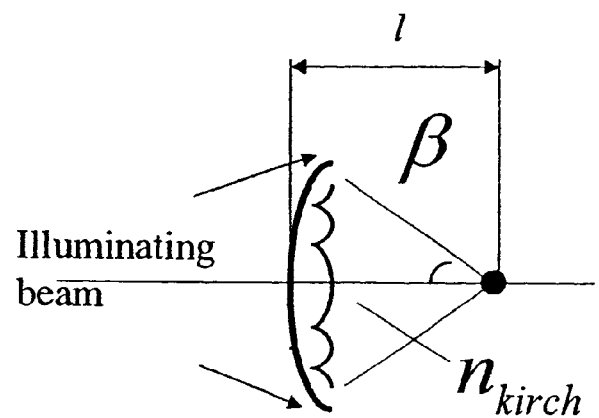
Fig. 7. Equivalent scheme for diffraction
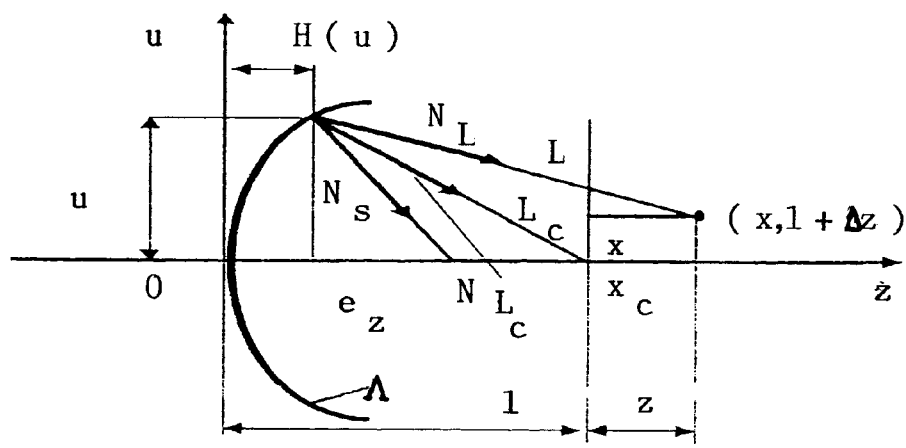
Fig. 8.
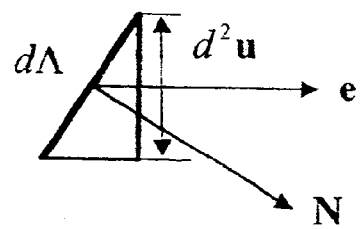
Fig. 9.

SIMULTANEOUS MULTIFOCAL CONTACT LENS AND METHOD OF UTILIZING SAME FOR TREATING VISUAL DISORDERS

FIELD AND BACKGROUND OF THE INVENTION

The present invention relates to a multifocal lens capable of providing a wearer with a focused vision in a range of distances and of a method of utilizing same for treating an individual suffering from a visual disorder such as presbyopia. More particularly, the present invention relates to a simultaneous multifocal contact lens which employs over-correction of a near vision additional correction of a peripheral near vision focal region to thereby provide a wearer with a complete range of focused vision, in particular focused near vision.

As an individual advances in years, typically past 40–45, a physiologic loss of accommodation in the eyes begins. This physiological loss, which is termed presbyopia, is characterized by an inability to focus on objects that are relatively near to the individual (typically less then 22 cm). In addition to aging, a variety of eye disorders, such as, for example, cataract, which often necessitates lens replacement, can also abolish an individual's ability to focus throughout a range of distances.

To correct the loss of a vision range, individuals rely upon spectacles, contact lenses or ophthalmic lens (in the case of lens replacement) having a number of different regions with different optical powers in order to find the appropriate optical power for the object or objects upon which the observer wishes to focus.

With spectacles, the process involves shifting the field of vision from typically an upper lens portion far power to a lower lens portion near power. With contact lenses, however, this approach has been less than satisfactory.

The prior art teaches two types of contact lens designs for the correction of presbyopia, alternating (or translating) and simultaneous.

The design of alternating (or translating) lenses is very similar to bifocal eyeglass lenses in that the wearer sees through the distance segment in the upper portion of the lens when looking straight ahead and sees through a lower near vision segment when the eye is moved to look down. The translation from distance to near in these lenses is achieved through the mechanical action of the lens resting on the lower eyelid and, when the eye looks down, the lens remains stable on the lower eyelid causing the pupil of the eye to translate from the distant vision portion of the lens to the near vision portion of the lens. As such, when fabricated from soft materials, numerous operational problems plagued these lenses which have, therefore, enjoyed very limited commercial success.

The design of simultaneous vision bifocal or multifocal contact lenses is either concentric or aspheric with focal power changing through different areas of the lens. These lenses are fitted so that distance, intermediate and near zones focus images simultaneously on the retina of the eye and the brain then separates out the image desired.

Theoretically, with adaptation, the ability to change focus naturally from near to far with no blurring in between can be achieved with simultaneous vision lenses.

As alternating presbyopic designs proved to be unsuccessful in soft contact lens designs, most of the development work with soft contact lenses was done in the area of simultaneous presbyopic correction with concentric designs or aspheric designs. Numerous examples of simultaneous bifocal contact lenses or ophthalmic lens exist in the art.

For example, U.S. Pat. No. 4,923,296 to Erickson describes a lens system which comprises a pair of contact lenses, each having equal areas of near and distant optical power, with the lens for one eye having a near upper half and a distant lower half and the lens for the other eye having a distant upper half and near lower half. Together they provide at least partial clear images in both eyes, and through suppression by the brain of the blurred images, allow alignment of the clear images to produce an in-focus image.

U.S. Pat. No. 4,890,913 to de Carle describes a bifocal contact lens comprising a number of annular zones having different optical powers. The object in the design of this lens is to maintain, at all times, regardless of pupil diameter, an approximately equal division between near and distant powers, which requires between six and twelve total zones on the lens.

Another attempt at providing a bifocal contact lens is described in U.S. Pat. No. 4,704,016 to de Carle. Again, this lens attempts to maintain, at all times, regardless of pupil diameter, an approximately equal division between near and distant powers.

Yet another attempt at providing a bifocal contact lens is described in U.S. Pat. No. 5,929,969. This lens comprises a number of circular ring zones of two optical powers.

Although the above described bifocal lenses provide some vision correction, a mismatching of the various optical zones may lead to destructive interference and thus a less than optimal vision in some instances.

In addition to bi-focal lenses, a number of multifocal lenses which attempt to improve upon their bifocal counterparts have also been described.

For example, U.S. Pat. No. 5,448,312 describes a multifocal concentric ophthalmic lens for presbyopic patients constructed with three general annular lens portions in a multifocal design. A central circular portion of the lens has only the patient's distance corrective power, and is surrounded by a first inner annular portion, which can consist of multiple annular rings having an inner radial portion which enhances the patient's near focal power encircled by radial portions of substantially equal cumulative amounts of distance and near optical power focal correction for the patient. This is surrounded by a second outer annular portion, which can also consist of one or more annular rings having additional distance focal power near the periphery of the optical surface area of the ophthalmic lens. Each annular ring has either a near or distance optical power and works in combination with other lens portions to yield the desired focal ratio in that portion of the lens.

U.S. Pat. No. 5,682,223 describes a multifocal lens design with near, far and intermediate optical power zones. The borders of these zones are optimized for pupil size as a function of lighting conditions.

In this design, zone placement and zone radii are not carefully planed and as such destructive interference cannot be avoided.

To overcome interference problems, U.S. Pat. No. 5,982,543 describes a multi refractive zone lens optimized with consideration for phase match between the zones.

However, the lens design described features lens coherence properties in visible light which vary considerably from one scene to the next.

Although some of the above described lenses have traversed some of the limitations inherent to multifocal lenses, these lenses still provide sub-optimal vision correction for some or all vision ranges.

The above described prior art designs, be it aspheric or concentric, cannot provide monocular multifocal correction for moderate to mature presbyopia. In most cases, some form of modified monovision is required in an attempt to satisfy the visual requirement for near and far vision.

To address this and other problems typical of prior art simultaneous multifocal lenses a variety of lenses with under or over corrected focal regions have been described.

For example, U.S. Pat. Nos. 5,864,378 and 5,864,379 describe a contact lens and an opthalmic lens (respectively) in which a central near vision zone ('379), or both a central near vision zone and a peripheral far vision zone ('378) are overcorrected. According to these patents, while such a correction does not impair distance vision, it compensates for presbyopia and therefore allows a user to focus on objects within a range of near and intermediate distances.

U.S. Pat. Nos. 5,919,229 and 5,702,440 both describe contact lenses with undercorrected peripheral near vision zones.

Although these lenses substantially enhance the focus range of an individual as compared to other prior art designs, such lenses still suffer from limitations which arise from the nature of the correction or the lens position of the vision region which is corrected. As such, these prior art lens designs cannot completely compensate for moderate to severe presbyopia, thus resulting in a less than a complete range of focused vision.

There is thus a widely recognized need for, and it would be highly advantageous to have, a simultaneous multifocal lens which can overcome presbyopia, thus providing a complete range of focused vision, in particular focused near vision, while at the same time having a relatively short period of visual adjustment and being comfortable to the wearer.

SUMMARY OF THE INVENTION

According to one aspect of the present invention there is provided a simultaneous multifocal contact lens for correcting vision acuity of an individual, the contact lens comprising a central region radially surrounded by at least one far vision focal region and at least one near vision focal region, wherein a near vision additional correction of the at least one near vision focal region is overcorrected by at least 10% with respect to the near vision additional correction prescribed for the individual according to a standard prescription for lens radius design.

According to another aspect of the present invention there is provided a method of improving visual acuity in an individual suffering from presbyopia, the method comprising the steps of (a) fabricating, according to a prescription of the individual, a pair of simultaneous multifocal contact lenses each including a central region radially surrounded by at least one far vision focal region and at least one near vision focal region, wherein a near vision additional correction of the at least one near vision focal region is overcorrected by at least 10% with respect to the near vision additional correction prescribed for the individual according to a standard prescription for lens radius design; and (b) fitting the individual with the pair of simultaneous multifocal contact lenses to thereby improve the visual acuity of the individual.

According to further features in preferred embodiments of the invention described below, the near vision additional correction of the at least one near vision focal region is overcorrected by 10 to 100% with respect to the near vision additional correction prescribed for the individual according to the standard prescription for lens radius design.

According to still further features in the described preferred embodiments the near vision additional correction of the at least one near vision focal region is overcorrected by 15 to 70% with respect to the near vision additional correction prescribed for the individual according to the standard prescription for lens radius design.

According to still further features in the described preferred embodiments the near vision additional correction of the at least one near vision focal region is overcorrected by 20 to 50% with respect to the near vision additional correction prescribed for the individual according to the standard prescription for lens radius design.

According to still further features in the described preferred embodiments a surface of the simultaneous multifocal contact lens which lies adjacent to a cornea of the individual is quadrically aspherically shaped with substantially identical eccentricity throughout and a substantially constant radius for each of the at least one near and the at least one far vision focal regions.

According to still further features in the described preferred embodiments the at least one near and the at least one far vision focal regions are each shaped as distinct rings.

According to still further features in the described preferred embodiments the focal regions radiate outwardly from the central region in an alternating sequence including the far vision focal region and the near vision focal region.

According to still further features in the described preferred embodiments the sequence is repeated at least twice.

According to still further features in the described preferred embodiments the sequence is repeated at least three times.

According to still further features in the described preferred embodiments the focal regions radiating outwardly from the central region are positioned 1.125, 1.275, 1.525, 1.675, 1.9 and 4.0 mm from a center of the central region.

According to still further features in the described preferred embodiments the simultaneous multifocal lens further comprising a tri-focal diffractive microrelief profile region being positioned at an outermost region of the simultaneous multifocal lens and being for ensuring in-phase interference of the at least one near vision focal region and the at least one far vision focal region when each being at a proper focus.

According to still further features in the described preferred embodiments the simultaneous multifocal contact lens further comprising at least one intermediate vision focal region radially surrounding the central region.

According to still further features in the described preferred embodiments a surface of the simultaneous multifocal contact lens which lies adjacent to a cornea of the individual is quadrically aspherically shaped with substantially identical eccentricity throughout and a substantially constant radius for each of the at least one near, the at least one intermediate and the at least one far vision focal regions.

According to still further features in the described preferred embodiments the at least one near, the at least one intermediate and the at least one far vision focal regions are each shaped as distinct rings.

According to still further features in the described preferred embodiments the focal regions radiate outwardly from the central region in an alternating sequence including the far vision focal region, the intermediate vision focal region and the near vision focal region.

According to still further features in the described preferred embodiments the sequence is repeated at least twice.

According to still further features in the described preferred embodiments the sequence is repeated at least three times.

According to still further features in the described preferred embodiments the near and intermediate focal regions radiate outwardly from the central region in an alternating sequence.

According to still further features in the described preferred embodiments the sequence is repeated at least twice.

According to still further features in the described preferred embodiments the sequences are surrounded by the at least one far vision focal region.

According to still further features in the described preferred embodiments the focal regions radiating outwardly from the central region are positioned 1.275, 1.525, 1.675, 1.9 and 4.0 mm from a center of the central region.

According to still further features in the described preferred embodiments the simultaneous multifocal lens further comprising a tri-focal diffractive microrelief profile region being positioned at an outermost region of the simultaneous multifocal lens and being for ensuring in-phase interference of the at least one near vision focal region, the at least one intermediate vision focal region and the at least one far vision focal region when each being at a proper focus.

According to still further features in the described preferred embodiments the central region is a far vision focal region.

According to still further features in the described preferred embodiments the central region is a near vision focal region.

According to still further features in the described preferred embodiments the near vision additional correction of the central region is as prescribed for the individual according to the standard prescription for lens radius design.

The present invention successfully addresses the shortcomings of the presently known configurations by providing a multifocal lens capable of providing a wearer with a focused vision in a range of distances which is superior over prior art designs because apparently it accounts for distortions of base curve radii for near vision optical regions associated with contacting the lens with an eye.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 7 illustrates an optical scheme for light propagation through regions of the simultaneous multifocal contact lens according to the teachings of the present invention;

FIG. 8 illustrates light diffraction on a curved surface of the simultaneous multifocal contact lens according to the teachings of the present invention; and FIG. 9 illustrates a tilt of an element of the curved surface of the simultaneous multifocal contact lens according to the teachings of the present invention.

DESCRIPTION OF THE PREFERRED EMBODIMENTS

Figure 1:
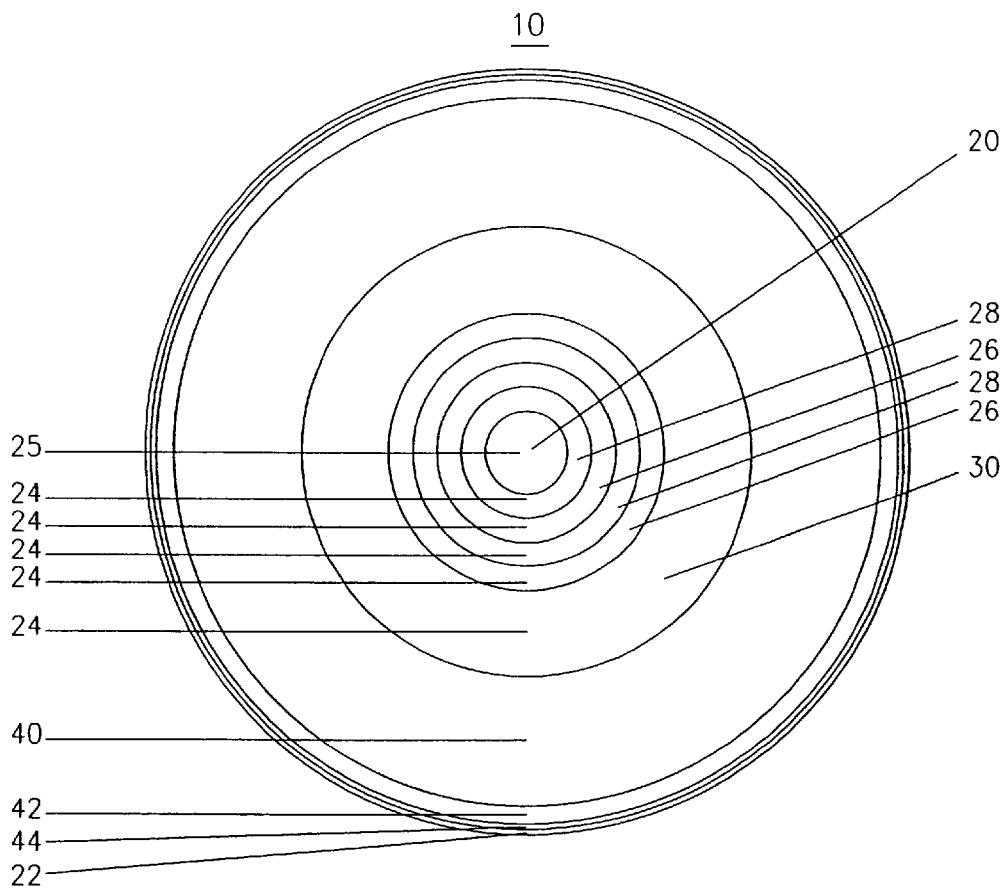
FIG. 1 is a front view of a simultaneous multifocal contact lens according to the teachings of the present invention.

The present invention is of a multifocal lens and a method of utilizing same for treating an individual suffering from a visual disorder such as, for example, presbyopia. Specifically, the present invention is of a simultaneous multifocal contact lens which employs overcorrection of a near vision additional correction of a peripheral near vision focal region and can be used to provide a wearer suffering from a visual disorder, such as presbyopia, with a complete range of focused vision, in particular focused near vision.

The principles and operation of the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 2:
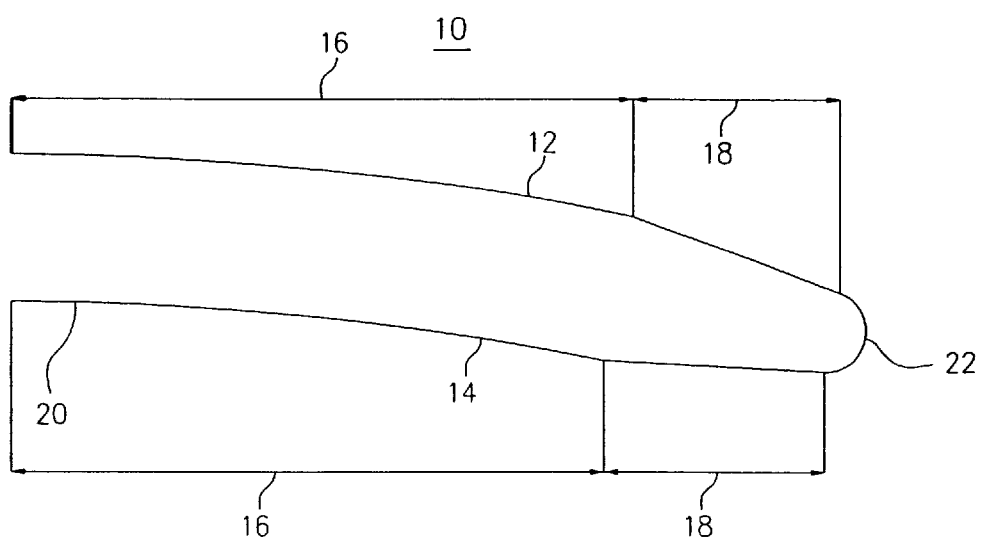
FIG. 2 is a side view of one half of the simultaneous multifocal contact lens according to the teachings of the present invention.
Figure 3:
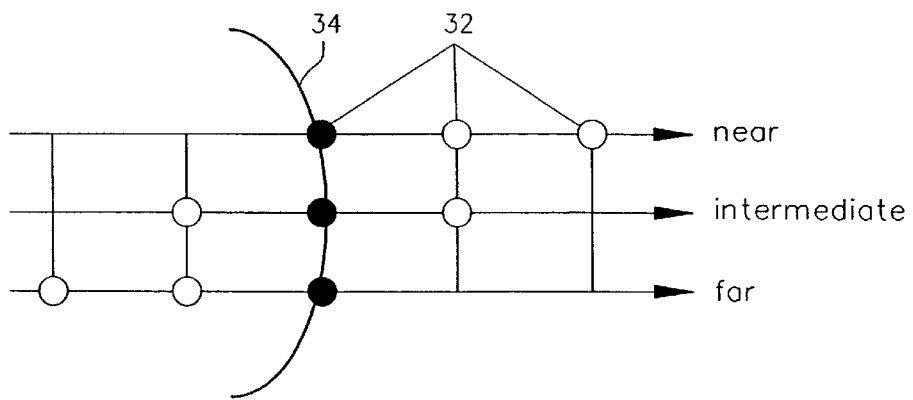
FIG. 3 depicts simultaneous focusing of an image by three types of focal regions of the simultaneous multifocal contact lens according to the teachings of the present invention.

Referring now to the drawings, FIGS. 1–3 illustrate the simultaneous multifocal contact lens for correcting vision acuity of an individual suffering from, for example, presbyopia, according to the present invention, which is referred to hereinunder as lens 10.

As is specifically shown in FIG. 1, lens 10 is substantially circular in shape with a typical diameter of between 9 and 14 mm which depends largely on the iris size and corneal shape of the individual fitted. Lens 10 is typically manufactured in sizes such as large, medium and small, within the above range.

As used herein the phrase "substantially circular" refers to a circular structure which is fabricated as close to a perfect circle as possible by presently practiced methods of lens manufacturing.

As is specifically shown in FIG. 2, lens 10 includes a front surface 12 which faces away from the cornea of the individual fitted with lens 10 and a back surface 14 which lies against the individual's cornea when lens 10 is fitted. Both front 12 and back 14 surfaces include an optical zone 16 and a non-optical zone 18 (lenticular zone on front 12 and peripheral zone on back 14 surfaces) which are curved in shape. Lens 10 further includes a center 20 and an edge 22, wherein the distance therebetween defines the radius of lens 10.

Lens 10 can be fabricated from any standard contact lens materials, i.e., rigid (gas permeable or PMMA) or soft (hydrogel). According to the present invention, lens 10 is preferably fabricated from soft polymeric materials i.e., polymeric materials which contain at least 10% by weight water after hydration, such as disclosed in U.S. Pat. Nos. 5,314,960 and 5,314,961 which are incorporated herein by reference. Lens 10 can be fabricated using methods known in the art, such as for example, single-path diamond-turning.

As used hereinbelow, the terms "near", "far" and "intermediate" when used with reference to focal regions 24 and/or region 25 of lens 10 refer to a distance from the eye which can be focused thereby. Thus, for example, a near vision focal region is configured with an optical or focal power (>0 diopters) capable of correcting vision in individuals suffering from near vision sight problems (e.g., far-sightedness).

As used herein the phrases "focal power" or "optical power" when used with reference to focal region 24 or focal region 25 of lens 10 interchangeably refer to the ability of these regions to refract and thus focus incoming light.

As specifically shown in FIG. 1, optical zone 16 of lens 10 includes several distinct focal regions 24 preferably arranged as concentric rings surrounding a substantially circular central region 25. Region 25 which is positioned in the center of lens 10 can be configured with an optical power for providing focused near vision (>0 diopters of addition) or far vision (<0 diopters of addition). Preferably region 25 of lens 10 of the present invention is a far vision focal region and thus serves for bringing into focus objects which are positioned far from the individual fitted with lens 10 (typically and preferably more than 600 cm).

According to the present invention, regions 24 include near vision 26, and far vision 30 focal regions. Regions 26 and 30 are configured of an optical power capable of bringing into focus objects situated either near (typically between 20 to 40 cm) or far (typically more than 600 cm) from the eye of the individual. Preferably, regions 24 also include at least one intermediate vision focal region 28 which serves to bring into focus objects placed within a distance range of 40 to 200 cm away from the eye of the individual fitted with lens 10.

It will be appreciated, that numerous examples to contact lenses which include a central focal portion surrounded by concentric focal regions are known in the art. As is further detailed in the Background section above, some of these prior art lenses also employ over or under correction of focal regions, specifically under correction of peripheral far focal regions or overcorrection of a central near focal region. Although such corrections substantially improve the ability of a contact lens to focus objects positioned throughout a distance range, some limitations still apply, especially when such prior art configurations are applied to soft (hydrogel) contact lenses.

Without an intention of being limited by any theory, based on the assumption that a soft contact lens distorts to conform to the shape of the cornea, and assuming that a change in a radius for near focus regions is performed at the base curve, the front curve of front surface 12 at the peripheral near vision focal regions will replicate these changes only to a certain degree. Thus, a compensation for the near focal regions must be applied by providing additional focal power to these regions (overcorrection). Due to higher distortion at the lens periphery, this overcorrection must increase outwardly from the center of the radius. The amount of overcorrection is determined by the distortion of the lens which is governed by the lens material and it's thickness.

Near vision addition powers are referred to by eye care professionals as "add" power, and represent the difference between the distance correction and near correction prescribed by an eye care professional for eyeglasses or contact lenses. Accordingly, a prescription of "−3 with a +2 add" (which would be typical for moderate presbyopia) would mean that distance vision requires −3 diopters of correction, and near vision requires an additional 2 diopters of plus correction, resulting in −1 diopters of near vision correction.

While reducing the present invention to practice it was uncovered that with typical lens materials, typical overcompensation of about 30% additional focal power to the near focal regions unexpectedly improves near eye sight of fitted individuals. Thus, a lens focal configuration which employs over correction of the additional correction ("add") component of a near vision peripheral focal region by approximately 30% was found to be far superior to the prior art configuration mentioned hereinabove since such a configuration compensates for the lack of focal power of the peripheral near vision focal regions which due to lens distortion are typically under-powered when worn over the eye. These considerations are discussed in greater detail in the Example provided hereinbelow.

Thus, according to preferred embodiments of the present invention, the additional correction ("add") used to determine the focal power of near vision focal region(s) 26 is overcorrected by at least 10%, preferably 10–100%, more preferably 15 to 70%, most preferably 20–50% with respect to the near vision additional correction prescribed for the individual as determined by the standard prescription for lens radius design (lens maker formula).

It will be appreciated that optical zone 16 can include any number of regions 26, 28 and/or 30. For example, a sequence including near 26 and intermediate 28 regions, near 26 and far 30 regions, intermediate 28 and far 30 regions or all three types of regions 24 can be utilized in optical zone 16. This sequence, which can be arranged in any order can be repeated at least two to at least three times.

According to another preferred embodiment of the present invention, optical zone 16 includes a sequence including intermediate region 28 followed by near region 26, which is repeated twice and followed by a single far region 30.

According to this configuration outer boundaries of regions 24 (in the order described above) are preferably positioned 1.275, 1.525, 1.675, 1.9 and 4.0 mm, respectively, from lens center 20, wherein an outer boundary of region 25 is positioned 1.125 mm from lens center 20.

As is further detailed hereinbelow and in the Example which follows, focal regions 24 and central region 25 are configured with an optical power (expressed in, for example, diopters) which allows an individual fitted with a pair of lens 10 to bring into focus objects which are positioned near, far or at any distance in between away from the individual's eyes.

It will be appreciated that the optical power of each of regions 24 and region 25 can be generated by either configuring regions 24 and region 25 from materials of a different refraction index and/or by varying the shape (degree of curvature) of front 12 and/or back 14 surfaces of each region.

According to another preferred embodiment of the present invention, back surface 14 is quadrically aspherically shaped with substantially identical eccentricity throughout and a substantially constant radius for each of regions 24.

The configuration of lens 10 according to the present invention enables an individual fitted therewith to readily bring into focus an object located at any distance therefrom. This feature of lens 10 of the present invention is enabled since under certain circumstances the human brain can discriminate between separate competing images by accepting an in-focus image and rejecting an out-of-focus image. Thus, an individual fitted with lens 10 will perceive the in focus image of an object while being oblivious to the out-of-focus images of this object.

This is exemplified by FIG. 3, wherein an object 32 captured by all three types of focal regions 24, is only focused by one type of region. Thus, as shown by the three possible alternatives, only one type of focal region 24 will focus object 32 onto retina 34 (as is indicated by black image) while the other types of focal regions 24 will focus the same object 32 either behind or in front of the retina 34 (as indicated by gray images) and thus out of focus as perceived by the brain. Since the out-of-focus images of object 32 (as indicated by gray images in FIG. 3) are disregarded by the brain, the individual perceives object 32 clearly and in focus regardless of its distance to the eye of the individual.

According to another preferred embodiment of the present invention lens 10 further includes a tri-focal diffractive microrelief profile region 40. Region 40 is positioned outside and adjacent to regions 24 of the simultaneous multifocal lens and serves for ensuring in-phase interference of regions 24 when each is at a proper focus.

Lens 10 further includes a bevel region 42 and a blend region 44 interposed between edge 22 and region 40. These regions function to mechanically position lens 10 on the cornea.

Thus, lens 10 of the present invention can be utilized for treating an individual suffering from a visual disorder, such as, for example, presbyopia, by first determining a visual acuity of an individual by, for example, a common eye examination. Following the determination of the focal power necessary for near and far vision focal regions, by using, for example, the standard prescription for lens radius design, the focal power of the peripheral near vision focal regions is then overcorrected as described above and as is further exemplified by the Example that follows.

The resulting lens 10 fabricated according to the guidelines of the present invention thus provides the individual with a range of focused vision while substantially improving the near vision acuity as compared to prior art lenses.

Additional objects, advantages, and novel features of the present invention will become apparent to one ordinarily skilled in the art upon examination of the following example, which is not intended to be limiting. Additionally, each of the various embodiments and aspects of the present invention as delineated hereinabove and as claimed in the claims section below finds experimental support in the following example.

EXAMPLE

Reference is now made to the following example, which together with the above descriptions, illustrate the invention in a non limiting fashion.

The focal property of the various focal regions of the lens of the present invention is achieved by changing the radius of curvature of the various regions at one or both of the smooth optical surfaces (back and front). For example, the back surface can feature piecewise smooth optical regions and periphery. The surface is then considered piecewise smooth instead of a fully smooth surface. This surface includes three foci regions or three types of objects distances: far, intermediate and near.

The contact lens according to the present invention is designed with consideration to the following parameters:

$D_{far}$—optical power for far vision in accordance to prescription of the patient.

Add—addition in optical power for near vision, as is compared with far vision.

$R_b$, ecc—radius of curvature and eccentricity of base curve in accordance with the prescription of the patient (ecc=0 corresponds to spherical shape).

$n_M$—refractive index of the contact lens material when hydrated.

CT—central thickness is determined from mechanical properties and therefore considered as a given for optical design.

Several formulas can be utilized to calculate the optical power of a lens:
(i) the "lens-maker's formula":

$$D = 1000(n_M - 1)\left[\frac{1}{R_f - \frac{n_M - 1}{n_M}CT} - \frac{1}{R_b}\right] \quad (1)$$

which can be utilized for calculating the optical power (in diopters) according to the radii of curvature, (ii) the paraxial thick lens formula:

$$D_{thicklens} = 1000(n_M - 1)\left[\frac{1}{R_f} - \frac{1}{R_b} + \frac{n_M - 1}{n_M}CT\frac{1}{R_f}\frac{1}{R_b}\right] \quad (2)$$

and (iii) aspherical surface optimized for best focus.

An inversed "lens-maker's formula" can also utilized for calculating the proper radii of curvature.

The lens design according to the present invention, starts by calculating a front curve radius of curvature $R_f$ using the following:

$$R_f = (n_M - 1)\left[\left(\frac{D_{far}}{1000} - \frac{n_M - 1}{R_b}\right)^{-1} + \frac{1}{n_M}CT\right] \quad (3)$$

The radius of curvature of a piecewise base curve in the regions responsible for far vision is calculated as follows:

$$R_{bfar} = R_b \quad (4)$$

The radius of curvature of a piecewise base curve in the regions responsible for intermediate vision is calculated as follows:

$$R_{bmiddle} = \left(\frac{1}{R_b} - \frac{Add}{2000(n_M - 1)}\right)^{-1} \quad (5)$$

by utilizing half of the Add correction.

The radius of curvature of the piecewise base curve in the regions responsible for near vision is expected to be as follows:

$$R_{bnear} = \left(\frac{1}{R_b} - \frac{Add}{1000(n_M - 1)}\right)^{-1} \quad (6)$$

by using a full Add correction.

The unique feature of the lens of the present invention is the use of over-correction for calculating a radius of a curvature piecewise base curve in the regions responsible for near vision. This is effected as follows:

$$Add_{over} = Add \cdot Cov \quad (7)$$

where Cov is the correction coefficient which is preferably selected between 1.1 and 1.5.

By replacing Add by $Add_{over}$ in equation 7 the following equation is generated:

$$R_{bnear} = \left(\frac{1}{R_b} - \frac{Add_{over}}{1000(n_M - 1)}\right)^{-1} \quad (8)$$

Over-correction is utilized by the present invention only for calculating the radius of curvature of a piecewise base curve in the regions responsible for near vision, while a non-corrected (standard) Add is used for intermediate vision region(s). The use of over-correction improves the ability of the lens according to the present invention in terms of supporting triple-foci operations, since it directs rays of light into a proper foci.

As mentioned hereinabove, the lens according to the present invention, includes a back surface shaped with quadrics aspherics with the same eccentricity in all clear aperture and constant radius in each of the peripheral ring-shaped optical regions. The central region of the configuration according to the present invention is a far vision region which is surrounded by a twice repeated periodic sequence containing consecutive intermediate and near vision regions followed by a far vision region. Thus, the lens contains six regions with coordinates of borders of 1.125 mm, 1.275 mm, 1.525 mm, 1.675 mm, 1.9 mm and 4.0 mm from the center of the lens. In addition, the lens also includes a tri-focal diffractive microrelief profile region positioned outside the above mentioned optical regions. This tri-focal diffractive microrelief profile region ensures in-phase interference of all the optical regions when at proper focus.

By fabricating the lens of the present invention while utilizing an Rb of 8.4, material of nM which equals 1.44 and an Add value of 2.5 the following is obtained:

$R_{bfar}$ = 8.4 mm $R_{bmiddle}$ = 8.605 mm $R_{bnear}$ = 8.956 mm

Thus, the optimized coordinates (semi-diameters) of the various regions are:

| $d_i$ × 0.5 | $R_{bi}$ |
|---|---|
| 1.125 | 8.4 |
| 1.275 | 8.6 |
| 1.525 | 8.956 |
| 1.675 | 8.6 |

-continued

| $d_i$ × 0.5 | $R_{bi}$ |
|---|---|
| 1.9 | 8.956 |
| 4.0 | 8.4 |

Figure 4:
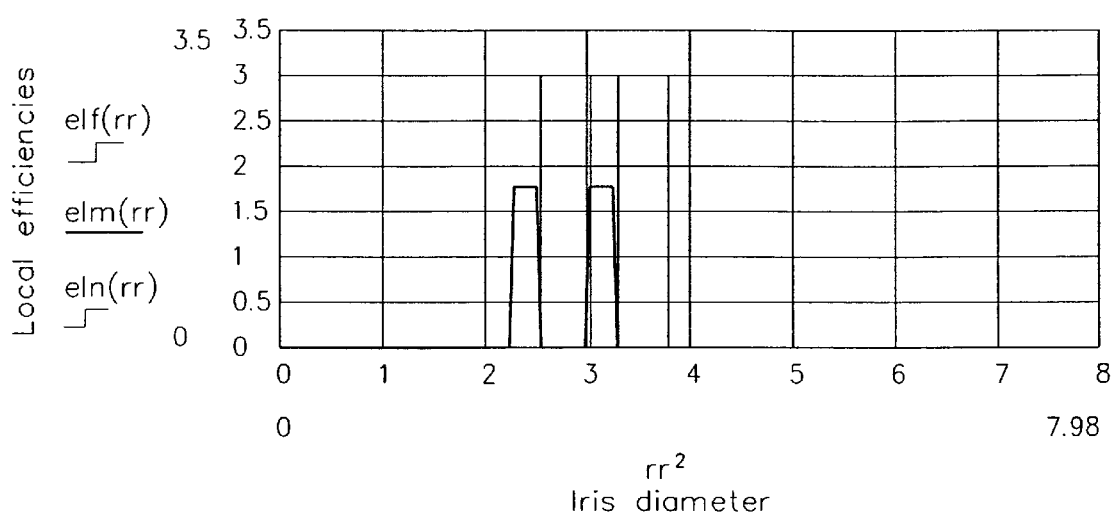
FIG. 4 is a graph depicting coordinates of optical regions of the simultaneous multifocal contact lens according to the teachings of the present invention and their respective optical power distribution.
Figure 5:
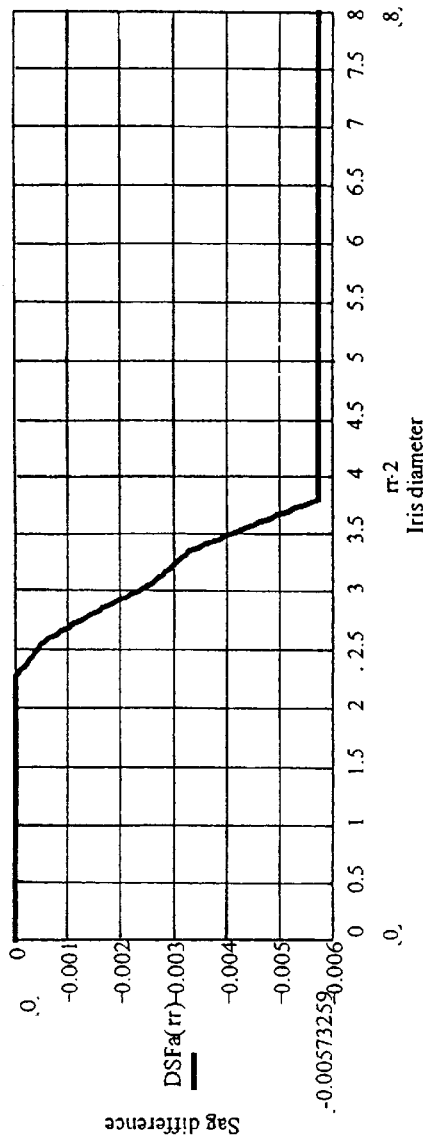
FIG. 5 is a graph representing a sag difference between smooth and piecewise smooth curves of the simultaneous multifocal contact lens is according to the teachings of the present invention.
Figure 6:
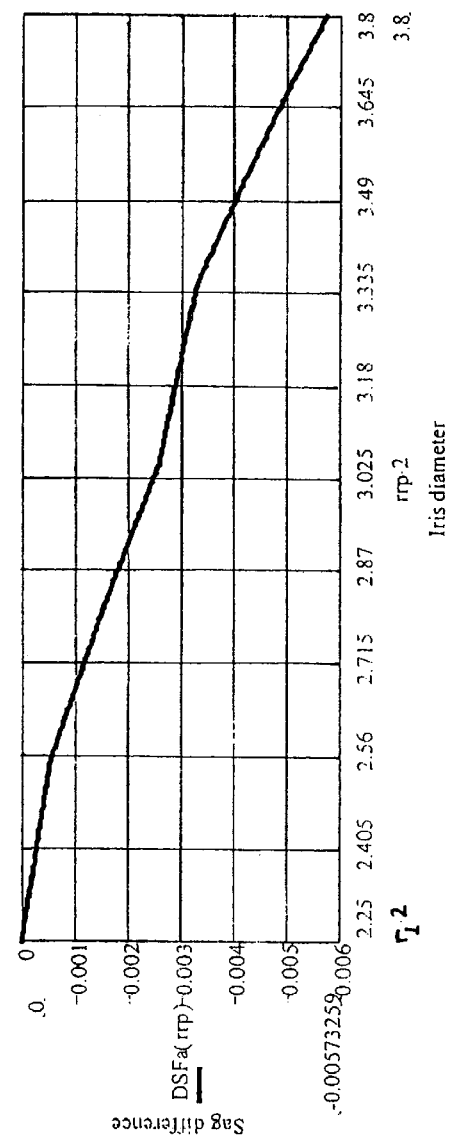
FIG. 6 is a graph representing a magnified view of the sag difference between smooth and piecewise smooth curves in a portion of the simultaneous multifocal contact lens according to the teachings of the present invention.

FIGS. 4–6 illustrate some of the parameters of a lens fabricated according to the teachings of the present invention. FIG. 4 illustrates the coordinates of the various optical regions and optical power distribution thereof; FIG. 5 illustrates a sag difference between smooth and piecewise smooth curve in all of the various optical regions, while FIG. 6 illustrates a magnified view of the sag difference between a smooth and a piecewise smooth curve in all of the various optical regions.

The design of the contact lens according to the present invention is effected via a computer simulation of retinal intensity.

FIG. 7 illustrates an equivalent light diffraction scheme for the various focal regions of the multifocal contact lens designed according to the present invention. Indicated are the positions of the three foci, their spot-sizes and also the light beam power distribution between foci. The peak intensity for each focus region is determined by the computer simulation. FIG. 8 presents a Detailed scheme for diffraction on curved surface, while FIG. 9 illustrates the tilt of the element of a curved surface.

The computer simulation is based upon the following algorithm:

A Cartesian 3-D coordinate system centered at the vertex O of surface Λ with z-axis along optical axis is used. u=(u,v) is the transverse Cartesian coordinates of a current point (u,H) on surface Λ, while z=H(u) is the equation for surface Λ. $n_{kirch}$ is the Refractive index of the media following determination of surface Λ. Φ(u) is the Phase function of a piecewise phase delay on surface Λ.

Working under the assumption that a light field is concentrated around some center of observation with coordinates $(x_c,l)$, the task is to calculate light field w not only exactly at point $(x_c,l)$ but also for points (x,l+Δz) being close thereby (see FIG. 8).

By using a general Kirchhoff integral, which is applicable here due to rather wide optic regions, the following can be calculated:

$$w(x, l + \Delta z) = \frac{kn}{2\pi i} \int w_c(u, H(u)) \frac{\exp(iknL)}{L} K(u, x_c, \Delta z) d\Lambda \quad (9)$$

where $w_c$ is the light field impinging on the curved surface, L is the distance from a point on surface Λ to the impinging point, $K(u,x_c,\Delta z) = 0.5\{NN_s + N_L N_s\}$ is the tilt factor, $d\Lambda = \sqrt{1+|\nabla_\perp H|^2} d^2u$ is the element of square on surface Λ (see FIG. 9), $$\nabla_\perp = \left(\frac{\partial}{\partial u}, \frac{\partial}{\partial v}\right)$$

is the gradient with respect to coordinated (u,v), $N_s$ is the unit normal vector of surface Λ, N is the ray unit vector after diffractive microrelief, $N_L$ is the unit vector pointing towards the observation center from the point on surface Λ, k=2π/λ, λ—is the wavelength.

In such general form, Kirchhoff integral looks rather complicated and thus cannot be utilized in a Fourier transform as is usually done for Fresnel's transform under paraxial approximation. However, in addition to the parameters describing the complexity of a non-paraxial curved surface there exist a small but useful parameter which describes the image size of the point source. Once the optical system (lens) is imaging, the spot size is small compared to the focal length—"a small-spot approximation". Following a series of transformations with a small-spot approximation for light diffraction on microrelief located on curved radial symmetrical substrate and substitution of variables, the Kirchhoff integral can be utilized in a single Fourier transform. The substitution is nonlinear, because the distances depend on u; the intensity eikonal, and phase function can be any nonsymmetrical function. The calculation is as follows:

$$w(x, l+\Delta z) = \sqrt{\frac{E_{sph}}{S_{sph}}} \frac{\lambda \exp(ikn_{kirch}\Delta z)}{n_{kirch}l} \quad (10)$$

$$\int \sqrt{I_0(u)} \exp[ikS_0(u)+i\Phi(u)]K(u,0,\Delta z)\frac{L^2_{c\Delta z}}{L_c l_H}$$

$$\frac{\sqrt{1+|(H')|^2}}{|l_H+rH'|} \exp\left[-i2\pi \frac{\lambda}{n_{kirch}} \frac{L^2_{c\Delta z}}{2f_{def}(u,\Delta z)} v^2\right] \exp[i2\pi vx] dv$$

wherein, $E_{sph}$ is the total power of illuminating spherical beam converging into the center $x_c$ of watching points, $S_{sph}$ is the square of the sphere with radius l within the optical aperture of base surface.

$$L_c = \sqrt{[l-H(u)]^2+(x_c-u)^2}, \; L_{c\Delta z}=\sqrt{(l+\Delta z-H(u))^2+(x_c-u)^2}, \; l_H=l-H+\Delta (11)$$

The spatial frequencies and coordinates can be represented as follows:

$$v = \frac{n_{kirch}}{\lambda}\frac{u}{L_{c\Delta z}}; \; v = \frac{n_{kirch}}{\lambda}\frac{r}{\sqrt{l_H^2+r^2}} v = |v|, r = |u| \quad (12)$$

whereas the equivalent focus is:

$$f_{def} = \frac{(l_H+L_{c\Delta z})(l-H+L_c)}{2\Delta z\left[1+\frac{l+\Delta z/2-H}{(L_{c\Delta z}+L_c)/2}\right]} \quad (13)$$

and the tilt factor is:

$$K = \frac{\frac{\lambda}{n_{kirch}}vH' + \sqrt{1-\frac{\lambda^2}{n^2}v^2} + \frac{l_H\frac{\lambda}{n_{kirch}}vH'}{L_c\sqrt{1-\frac{\lambda^2}{n_{kirch}^2}v^2}} + \frac{l-H}{L_c}}{2\sqrt{1+(H')^2}} \quad (14)$$

wherein H' is the derivative of H with respect to r.

Equation (10) enabled computer simulation in the case of a curved nonparaxial surface of a contact lens. All the algorithms were implemented by dedicated programs written by the inventors in C++ object-oriented programming language. The results of the computer simulation enabled optimization of the curvature radii.

The diffractive microrelief region of the lens of the present invention can be generated by diamond latching the region outside the optical region. For example a −1 diffraction order with negative power is suitable for far objects, a 0 order with zero optical power is suitable for objects of an intermediate distance and a +1 order with positive optical power is suitable for near objects. A lens fabricated with this diffractive microrelief pattern is of an improved function because it optimally directs rays of light into the proper foci.

Since multifocal contact lenses are typically fabricated from rigid or soft-type plastic materials by single-path diamond-turning a software program implementing the teachings of the present invention can generate CNC or similar format files suitable for diamond tip fabrication by Rank Pneumo, Precitech and other lathes.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications cited herein are incorporated by reference in their entirety. Citation or identification of any reference in this application shall not be construed as an admission that such reference is available as prior art to the present invention.

What is claimed is:

1. A simultaneous multifocal contact lens for correcting vision acuity of an individual, the contact lens comprising a central region radially surrounded by at least one far vision focal region and at least one near vision focal region, wherein a near vision additional correction of said at least one near vision focal region is overcorrected by at least 10% with respect to said near vision additional correction prescribed for the individual according to a standard prescription for lens radius design, wherein said central region is a near vision focal region, and wherein said near vision additional correction of said central region is as prescribed for the individual according to the standard prescription for lens radius design.

2. The simultaneous multifocal contact lens of claim 1, wherein said near vision additional correction of said at least one near vision focal region is overcorrected by 10 to 100% with respect to said near vision additional correction prescribed for the individual according to the standard prescription for lens radius design.

3. The simultaneous multifocal contact lens of claim 1, wherein said near vision additional correction of said at least one near vision focal region is overcorrected by 15 to 70% with respect to said near vision additional correction prescribed for the individual according to the standard prescription for lens radius design.

4. The simultaneous multifocal contact lens of claim 1, wherein said near vision additional correction of said at least one near vision focal region is overcorrected by 20 to 50% with respect to said near vision additional correction prescribed for the individual according to the standard prescription for lens radius design.

5. The simultaneous multifocal contact lens of claim 1, wherein a surface of the simultaneous multifocal contact lens which lies adjacent to a cornea of the individual is quadrically aspherically shaped with substantially identical eccentricity throughout and a substantially constant radius for each of said at least one near and said at least one far vision focal regions.

6. The simultaneous multifocal contact lens of claim 1, wherein said at least one near and said at least one far vision focal regions are each shaped as distinct rings.

7. The simultaneous multifocal contact lens of claim 6, wherein said focal regions radiate outwardly from said central region in an alternating sequence including said far vision focal region and said near vision focal region.

8. The simultaneous multifocal lens of claim 7, wherein said sequence is repeated at least twice.

9. The simultaneous multifocal lens of claim 7, wherein said sequence is repeated at least three times.

10. The simultaneous multifocal lens of claim 9, wherein said focal regions radiating outwardly from said central region are positioned 1.125, 1.275, 1.525, 1.675, 1.9 and 4.0 mm from a center of said central region.

11. The simultaneous multifocal lens of claim 1, further comprising a tri-focal diffractive microrelief profile region being positioned at an outermost region of the simultaneous multifocal lens and being for ensuring in-phase interference of said at least one near vision focal region and said at least one far vision focal region when each being at a proper focus.

12. The simultaneous multifocal contact lens of claim 1, further comprising at least one intermediate vision focal region radially surrounding said central region.

13. The simultaneous multifocal contact lens of claim 12, wherein a surface of the simultaneous multifocal contact lens which lies adjacent to a cornea of the individual is quadrically aspherically shaped with substantially identical eccentricity throughout and a substantially constant radius for each of said at least one near, said at least one intermediate and said at least one far vision focal regions.

14. The simultaneous multifocal contact lens of claim 12, wherein said at least one near, said at least one intermediate and said at least one far vision focal regions are each shaped as distinct rings.

15. The simultaneous multifocal contact lens of claim 14, wherein said focal regions radiate outwardly from said central region in an alternating sequence including said far vision focal region, said intermediate vision focal region and said near vision focal region.

16. The simultaneous multifocal lens of claim 15, wherein said sequence is repeated at least twice.

17. The simultaneous multifocal lens of claim 15, wherein said sequence is repeated at least three times.

18. The simultaneous multifocal lens of claim 14, wherein said near and intermediate focal regions radiate outwardly from said central region in an alternating sequence.

19. The simultaneous multifocal lens of claim 18, wherein said sequence is repeated at least twice.

20. The simultaneous multifocal lens of claim 18, wherein said sequences are surrounded by said at least one far vision focal region.

21. The simultaneous multifocal lens of claim 20, wherein said focal regions radiating outwardly from said central region are positioned 1.275, 1.525, 1.675, 1.9 and 4.0 mm from a center of said central region.

22. The simultaneous multifocal lens of claim 14, further comprising a tri-focal diffractive microrelief profile region being positioned at an outermost region of the simultaneous multifocal lens and being for ensuring in-phase interference of said at least one near vision focal region, said at least one intermediate vision focal region and said at least one far vision focal region when each being at a proper focus.

23. The simultaneous multifocal lens of claim 1, wherein said central region is a far vision focal region.

24. A method of improving visual acuity in an individual suffering from presbyopia, the method comprising the steps of:

(a) fabricating, according to a prescription of the individual, a pair of simultaneous multifocal contact lenses each including a central region radially surrounded by at least one far vision focal region and at least one near vision focal region, wherein a near vision additional correction of said at least one near vision focal region is overcorrected by at least 10% with respect to said near vision additional correction prescribed for the individual according to the standard prescription for lens radius design; and (b) fitting the individual with said pair of simultaneous multifocal contact lenses to thereby improve the visual acuity of the individual;

wherein said central region is a near vision focal region; and wherein said near vision additional correction of said central region is as prescribed for the individual according to the standard prescription for lens radius design.

25. The method of claim 24, wherein said near vision additional correction of said at least one near vision focal region is overcorrected by 10 to 100% with respect to said near vision additional correction prescribed for the individual according to the standard prescription for lens radius design.

26. The method of claim 24, wherein said near vision additional correction of said at least one near vision focal region is overcorrected by 15 to 70% with respect to said near vision additional correction prescribed for the individual according to the standard prescription for lens radius design.

27. The method of claim 24, wherein said near vision additional correction of said at least one near vision focal region is overcorrected by 20 to 50% with respect to said near vision additional correction prescribed for the individual according to the standard prescription for lens radius design.

28. The method of claim 24, wherein a surface of each of said pair of simultaneous multifocal contact lenses which lies adjacent to a cornea of the individual is quadrically aspherically shaped with substantially identical eccentricity throughout and a substantially constant radius for each of said at least one near and said at least one far vision focal regions.

29. The method of claim 24, wherein said at least one near and said at least one far vision focal regions are each shaped as distinct rings.

30. The method of claim 29, wherein said focal regions radiate outwardly from said central region in an alternating sequence including said far vision focal region and said near vision focal region.

31. The method of claim 30, wherein said sequence is repeated at least twice.

32. The method of claim 30, wherein said sequence is repeated at least three times.

33. The method of claim 32, wherein said focal regions radiating outwardly from said central region are positioned 1.125, 1.275, 1.525, 1.675, 1.9 and 4.0 mm from a center of said central region.

34. The method of claim 24, wherein each of said pair of simultaneous multifocal contact lenses further includes a tri-focal diffractive microrelief profile region being positioned at an outermost region thereof and being for ensuring in-phase interference of said at least one near vision focal region and said at least one far vision focal region when each being at a proper focus.

35. The method of claim 24, wherein each of said pair of simultaneous multifocal contact lenses further includes at least one intermediate vision focal region radially surrounding said central region.

36. The method of claim 35, wherein a surface of each of said pair of simultaneous multifocal contact lenses which lies adjacent to a cornea of the individual is quadrically aspherically shaped with substantially identical eccentricity throughout and a substantially constant radius for each of said at least one near, said at least one intermediate and said at least one far vision focal regions.

37. The method of claim 35, wherein said at least one near, said at least one intermediate and said at least one far vision focal regions are each shaped as distinct rings.

38. The method of claim 37, wherein said focal regions radiate outwardly from said central region in an alternating sequence including said far vision focal region, said intermediate vision focal region and said near vision focal region.

39. The method of claim 38, wherein said sequence is repeated at least twice.

40. The method of claim 38, wherein said sequence is repeated at least three times.

41. The method of claim 35, wherein said near and intermediate focal regions radiate outwardly from said central region in an alternating sequence.

42. The method of claim 41, wherein said sequence is repeated at least twice.

43. The method of claim 41, wherein said sequences are surrounded by said at least one far vision focal region.

44. The method of claim 43, wherein said focal regions radiating outwardly from said central region are positioned 1.275, 1.525, 1.675, 1.9 and 4.0 mm from a center of said central region.

45. The method of claim 35, wherein each of said pair of simultaneous multifocal contact lenses further includes a tri-focal diffractive microrelief profile region being positioned at an outermost region of the simultaneous multifocal lens and being for ensuring in-phase interference of said at least one near vision focal region, said at least one intermediate vision focal region and said at least one far vision focal region when each being at a proper focus.

46. The method of claim 24, wherein said central region is a far vision focal region.

47. The simultaneous multifocal contact lens of claim 1, wherein said near vision additional correction of a first near vision focal region of said at least one near vision focal region is overcorrected by n %, whereas n is a number selected from a range between 10–50, and further wherein said near vision additional correction of a second near vision focal region of said at least one near vision focal region is overcorrected by n+10%.

48. A simultaneous multifocal contact lens for correcting vision acuity of an individual, the contact lens comprising a central region radially surrounded by at least one far vision focal region and at least one near vision focal region, wherein a near vision additional correction of said at least one near vision focal region is overcorrected by at least 10% with respect to said near vision additional correction prescribed for the individual according to a standard prescription for lens radius design; wherein said at least one near and said at least one far vision focal regions are each shaped as distinct rings; wherein said focal regions radiate outwardly from said central region in an alternating sequence including said far vision focal region and said near vision focal region; and wherein said sequence is repeated at least twice.

49. A simultaneous multifocal contact lens for correcting vision acuity of an individual, the contact lens comprising a central region radially surrounded by at least one far vision focal region and at least one near vision focal region, wherein a near vision additional correction of said at least one near vision focal region is overcorrected by at least 10% with respect to said near vision additional correction prescribed for the individual according to a standard prescription for lens radius design; wherein said at least one near and said at least one far vision focal regions are each shaped as distinct rings; wherein said focal regions radiate outwardly from said central region in an alternating sequence including said far vision focal region and said near vision focal region; and wherein said sequence is repeated at least three times.

50. A simultaneous multifocal contact lens for correcting vision acuity of an individual, the contact lens comprising a central region radially surrounded by at least one far vision focal region and at least one near vision focal region, wherein a near vision additional correction of said at least one near vision focal region is overcorrected by at least 10% with respect to said near vision additional correction prescribed for the individual according to a standard prescription for lens radius design; the simultaneous multifocal lens further comprising a tri-focal diffractive microrelief profile region being positioned at an outermost region of the simultaneous multifocal lens and being for ensuring in-phase interference of said at least one near vision focal region and said at least one far vision focal region when each being at a proper focus.

51. A simultaneous multifocal contact lens for correcting vision acuity of an individual, the contact lens comprising a central region radially surrounded by at least one far vision focal region and at least one near vision focal region, wherein a near vision additional correction of said at least one near vision focal region is overcorrected by at least 10% with respect to said near vision additional correction prescribed for the individual according to a standard prescription for lens radius design; the simultaneous multifocal lens further comprising at least one intermediate vision focal region radially surrounding said central region; wherein said at least one near, said at least one intermediate and said at least one far vision focal regions are each shaped as distinct rings; wherein said focal regions radiate outwardly from said central region in an alternating sequence including said far vision focal region, said intermediate vision focal region and said near vision focal region; and wherein said sequence is repeated at least twice.

52. A simultaneous multifocal contact lens for correcting vision acuity of an individual, the contact lens comprising a central region radially surrounded by at least one far vision focal region and at least one near vision focal region, wherein a near vision additional correction of said at least one near vision focal region is overcorrected by at least 10% with respect to said near vision additional correction prescribed for the individual according to a standard prescription for lens radius design; the simultaneous multifocal lens further comprising at least one intermediate vision focal region radially surrounding said central region; wherein said at least one near, said at least one intermediate and said at least one far vision focal regions are each shaped as distinct rings; wherein said focal regions radiate outwardly from said central region in an alternating sequence including said far vision focal region, said intermediate vision focal region and said near vision focal region; and wherein said sequence is repeated at least three times.

53. A simultaneous multifocal contact lens for correcting vision acuity of an individual, the contact lens comprising a central region radially surrounded by at least one far vision focal region and at least one near vision focal region, wherein a near vision additional correction of said at least one near vision focal region is overcorrected by at least 10% with respect to said near vision additional correction prescribed for the individual according to a standard prescription for lens radius design; the simultaneous multifocal lens further comprising at least one intermediate vision focal region radially surrounding said central region; wherein said at least one near, said at least one intermediate and said at least one far vision focal regions are each shaped as distinct rings; wherein said near and intermediate focal regions radiate outwardly from said central region in an alternating sequence; and wherein said sequence is repeated at least twice.

54. A simultaneous multifocal contact lens for correcting vision acuity of an individual, the contact lens comprising a central region radially surrounded by at least one far vision focal region and at least one near vision focal region, wherein a near vision additional correction of said at least one near vision focal region is overcorrected by at least 10% with respect to said near vision additional correction prescribed for the individual according to a standard prescription for lens radius design; the simultaneous multifocal lens further comprising at least one intermediate vision focal region radially surrounding said central region; wherein said at least one near, said at least one intermediate and said at least one far vision focal regions are each shaped as distinct rings; the simultaneous multifocal lens further comprising a tri-focal diffractive microrelief profile region being positioned at an outermost region of the simultaneous multifocal lens and being for ensuring in-phase interference of said at least one near vision focal region, said at least one intermediate vision focal region and said at least one far vision focal region when each being at a proper focus.

55. A method of improving visual acuity in an individual suffering from presbyopia, the method comprising the steps of:
  (a) fabricating, according to a prescription of the individual, a pair of simultaneous multifocal contact lenses each including a central region radially surrounded by at least one far vision focal region and at least one near vision focal region, wherein a near vision additional correction of said at least one near vision focal region is overcorrected by at least 10% with respect to said near vision additional correction prescribed for the individual according to the standard prescription for lens radius design; and
  (b) fitting the individual with said pair of simultaneous multifocal contact lenses to thereby improve the visual acuity of the individual;
wherein said at least one near and said at least one far vision focal regions are each shaped as distinct rings; wherein said focal regions radiate outwardly from said central region in an alternating sequence including said far vision focal region and said near vision focal region; and wherein said sequence is repeated at least twice.

56. A method of improving visual acuity in an individual suffering from presbyopia, the method comprising the steps of:
  (a) fabricating, according to a prescription of the individual, a pair of simultaneous multifocal contact lenses each including a central region radially surrounded by at least one far vision focal region and at least one near vision focal region, wherein a near vision additional correction of said at least one near vision focal region is overcorrected by at least 10% with respect to said near vision additional correction prescribed for the individual according to the standard prescription for lens radius design; and
  (b) fitting the individual with said pair of simultaneous multifocal contact lenses to thereby improve the visual acuity of the individual;
wherein said at least one near and said at least one far vision focal regions are each shaped as distinct rings; wherein said focal regions radiate outwardly from said central region in an alternating sequence including said far vision focal region and said near vision focal region; and wherein said sequence is repeated at least three times.

57. A method of improving visual acuity in an individual suffering from presbyopia, the method comprising the steps of:
  (a) fabricating, according to a prescription of the individual, a pair of simultaneous multifocal contact lenses each including a central region radially surrounded by at least one far vision focal region and at least one near vision focal region, wherein a near vision additional correction of said at least one near vision focal region is overcorrected by at least 10% with respect to said near vision additional correction prescribed for the individual according to the standard prescription for lens radius design; and
  (b) fitting the individual with said pair of simultaneous multifocal contact lenses to thereby improve the visual acuity of the individual;
wherein each of said pair of simultaneous multifocal contact lenses further includes a tri-focal diffractive microrelief profile region being positioned at an outermost region thereof and being for ensuring in-phase interference of said at least one near vision focal region and said at least one far vision focal region when each being at proper focus.

58. A method of improving visual acuity in an individual suffering from presbyopia, the method comprising the steps of:
  (a) fabricating, according to a prescription of the individual, a pair of simultaneous multifocal contact lenses each including a central region radially surrounded by at least one far vision focal region and at least one near vision focal region, wherein a near vision additional correction of said at least one near vision focal region is overcorrected by at least 10% with respect to said near vision additional correction prescribed for the individual according to the standard prescription for lens radius design; and
  (b) fitting the individual with said pair of simultaneous multifocal contact lenses to thereby improve the visual acuity of the individual;
wherein each of said pair of simultaneous multifocal contact lenses further includes at least one intermediate vision focal region radially surrounding said central region; wherein said at least one near, said at least one intermediate and said at least one far vision focal regions are each shaped as distinct rings; wherein said focal regions radiate outwardly from said central region in an alternating sequence including said far vision focal region, said intermediate vision focal region and said near vision focal region; and wherein said sequence is repeated at least twice.

59. A method of improving visual acuity in an individual suffering from presbyopia, the method comprising the steps of:
  (a) fabricating, according to a prescription of the individual, a pair of simultaneous multifocal contact lenses each including a central region radially surrounded by at least one far vision focal region and at least one near vision focal region, wherein a near vision additional correction of said at least one near vision focal region is overcorrected by at least 10% with respect to said near vision additional correction prescribed for the individual according to the standard prescription for lens radius design; and
  (b) fitting the individual with said pair of simultaneous multifocal contact lenses to thereby improve the visual acuity of the individual;

wherein each of said pair of simultaneous multifocal contact lenses further includes at least one intermediate vision focal region radially surrounding said central region; wherein said at least one near, said at least one intermediate and said at least one far vision focal regions are each shaped as distinct rings; wherein said focal regions radiate outwardly from said central region in an alternating sequence including said far vision focal region, said intermediate vision focal region and said near vision focal region; and wherein said sequence is repeated at least three times.

60. A method of improving visual acuity in an individual suffering from presbyopia, the method comprising the steps of:
   (a) fabricating, according to a prescription of the individual, a pair of simultaneous multifocal contact lenses each including a central region radially surrounded by at least one far vision focal region and at least one near vision focal region, wherein a near vision additional correction of said at least one near vision focal region is overcorrected by at least 10% with respect to said near vision additional correction prescribed for the individual according to the standard prescription for lens radius design; and
   (b) fitting the individual with said pair of simultaneous multifocal contact lenses to thereby improve the visual acuity of the individual;

wherein each of said pair of simultaneous multifocal contact lenses further includes at least one intermediate vision focal region radially surrounding said central region; wherein said near and intermediate focal regions radiate outwardly from said central region in an alternating sequence; and wherein said sequence is repeated at least twice.

61. A method of improving visual acuity in an individual suffering from presbyopia, the method comprising the steps of:
   (a) fabricating, according to a prescription of the individual, a pair of simultaneous multifocal contact lenses each including a central region radially surrounded by at least one far vision focal region and at least one near vision focal region, wherein a near vision additional correction of said at least one near vision focal region is overcorrected by at least 10% with respect to said near vision additional correction prescribed for the individual according to the standard prescription for lens radius design; and
   (b) fitting the individual with said pair of simultaneous multifocal contact lenses, to thereby improve the visual acuity of the individual;

wherein each of said pair of simultaneous multifocal contact lenses further includes at least one intermediate vision focal region radially surrounding said central region; and wherein each of said pair of simultaneous multifocal contact lenses further includes a tri-focal diffractive microrelief profile region being positioned at an outermost region of the simultaneous multifocal lens and being for ensuring in-phase interference of said at least one near vision focal region, said at least one intermediate vision focal region and said at least one far vision focal region when each being at a proper focus.

62. A simultaneous multifocal contact lens for correcting vision acuity of an individual, the contact lens comprising a central far vision focal region radially surrounded by at least one far vision focal region and at least one near vision focal region, wherein a near vision additional correction of said at least one near vision focal region is overcorrected by at least 10% with respect to said near vision additional correction prescribed for the individual according to a standard prescription for lens radius design.

63. A method of improving visual acuity in an individual suffering from presbyopia, the method comprising the steps of:
   (a) fabricating, according to a prescription of the individual, a pair of simultaneous multifocal contact lenses each including a central far vision focal region radially surrounded by at least one far vision focal region and at least one near vision focal region, wherein a near vision additional correction of said at least one near vision focal region is overcorrected by at least 10% with respect to said near vision additional correction prescribed for the individual according to the standard prescription for lens radius design; and
   (b) fitting the individual with said pair of simultaneous multifocal contact lenses to thereby improve the visual acuity of the individual.

* * * * *